(12) United States Patent
Garrido Madorran

(10) Patent No.: US 7,694,503 B2
(45) Date of Patent: Apr. 13, 2010

(54) SHEARS-TYPE VIBRATOR FOR SHAKING TREES

(75) Inventor: Antonio Ángel Garrido Madorran, Autol (ES)

(73) Assignee: Maquinaria Garrido, S.L., Autol (ES)

( * ) Notice: Subject to any disclaimer, the term of this patent is extended or adjusted under 35 U.S.C. 154(b) by 0 days.

(21) Appl. No.: 12/375,961

(22) PCT Filed: Aug. 30, 2007

(86) PCT No.: PCT/ES2007/070153

§ 371 (c)(1),
(2), (4) Date: Feb. 2, 2009

(87) PCT Pub. No.: WO2008/034931

PCT Pub. Date: Mar. 27, 2008

(65) Prior Publication Data

US 2009/0308046 A1    Dec. 17, 2009

(30) Foreign Application Priority Data

Sep. 18, 2006    (ES)    ................... 200602360

(51) Int. Cl.
*A01D 46/00* (2006.01)
(52) U.S. Cl. .................................. 56/340.1
(58) Field of Classification Search ........... 56/340.1, 56/33, 328.1; 414/729, 753.1
See application file for complete search history.

(56) References Cited

U.S. PATENT DOCUMENTS

| 3,120,091 | A | * | 2/1964 | Gould et al. | ............... 56/340.1 |
| 4,194,347 | A | * | 3/1980 | Peters | ........................ 56/340.1 |
| 4,250,700 | A | * | 2/1981 | Horn et al. | .................... 56/330 |
| 4,286,426 | A | * | 9/1981 | Orlando et al. | ............... 56/330 |
| 4,336,682 | A | * | 6/1982 | Orlando | ....................... 56/330 |
| 4,418,521 | A | * | 12/1983 | Orlando et al. | ............... 56/330 |
| 4,621,488 | A | * | 11/1986 | Claxton | ....................... 56/330 |
| 5,842,334 | A | * | 12/1998 | Slates | ........................ 56/340.1 |
| 5,921,074 | A | * | 7/1999 | Scott et al. | ..................... 56/330 |

FOREIGN PATENT DOCUMENTS

| EP | 1210857 A1 | * | 6/2002 |
| FR | 2799610 A1 | * | 4/2001 |
| WO | WO 2004006646 A2 | * | 1/2004 |

* cited by examiner

*Primary Examiner*—Árpád Fábián-Kovács
(74) *Attorney, Agent, or Firm*—Dennis G. La Pointe

(57) ABSTRACT

A scissor-type vibrator for shaking trees wherein one of the arms thereof extends backwards to achieve a better working lever so that, on gripping the tree, the hydraulic piston that connects the two scissor arms expands, thus increasing the tightening torque whilst reducing the hydraulic pressure, and furthermore, to bring about the vibration, the scissor-type vibrator has a cam to which a synchronized single or double rotation may be applied and the vibration time may be regulated.

6 Claims, 2 Drawing Sheets

SHEARS-TYPE VIBRATOR FOR SHAKING TREES

RELATED APPLCIATIONS

This application is a 35 USC 371 national stage application based on international application PCT/ES2007/0701153 filed Aug. 30, 2007, which claims priority from Spain Application P200602360 filed Sep. 18, 2006.

OBJECT OF THE INVENTION

The object of the present invention is a scissor-type vibrator for shaking trees wherein one of the arms thereof extends backwards to achieve a better working lever.

Due to its special configuration, on gripping the tree, the hydraulic piston that connects the two scissor arms expands, thus increasing the tightening torque whilst reducing the hydraulic pressure.

Furthermore, to bring about the vibration, the scissor-type vibrator has a cam to which a synchronised single or double rotation may be applied, and the vibration time may be regulated.

BACKGROUND OF THE INVENTION

There are plenty of examples in the state of the art of vibrators for shaking trees that have two arms that are articulated at the opposite end to the area that grips the tree.

These include the Spanish patent with publication number ES2193816 that relates to a "multidirectional vibrating clamp", which has a hydraulic cylinder that closes when the arms of the vibrating clamp close.

With the aforementioned vibrating clamp, due to the situation of the hydraulic cylinder, high pressures are needed to close the two arms of the clamp.

Due to the need for this high pressure, which is associated with a multiplier effect thereof from the master cylinder that supplies the pressure to the hydraulic cylinder, malfunctions occur due to strain thereon.

All these problems are overcome by the invention disclosed herein due to the presence of a hydraulic cylinder that expands when the arms of the vibrator close, thereby eliminating the multiplier effect.

DESCRIPTION OF THE INVENTION

The present invention relates to a scissor-type vibrator for shaking trees wherein, on gripping the tree, the hydraulic piston that connects the two scissor arms expands, thus increasing the tightening torque whilst reducing the hydraulic pressure.

The scissor-type vibrator has two arms connected by an articulation that acts as the axis of rotation of one in relation to the other to open and close the mechanism.

The end of the arms that comes into contact with the tree has rubber pads protected by rubber flaps to prevent damaging the tree trunk.

The other ends of the arms have silent-blocks to balance the weights and prevent the vibrations and noise produced by actuating the vibrator.

One of the two arms extends backwards to the silent-block where one of the ends of the hydraulic cylinder is secured, whilst the other end is secured to the other arm in front of the articulation.

Once the arms grip the tree, a motor actuates a cam that transmits the movement to the rubber pads to vibrate the tree trunk.

The vibration can be achieved by a rotation of the motor in a single direction or by an alternating rotation in both directions, where the rotation time can be regulated to prevent damaging the tree by prolonging the vibration time.

Furthermore, the vibrator has a hydraulic brake that immediately stops the vibration of the tree.

DESCRIPTION OF THE DRAWINGS

The present description also has a set of non-limiting, illustrative plans by way of an example of the preferred embodiment of the invention.

PREFERRED EMBODIMENT OF THE INVENTION

Figure 1:
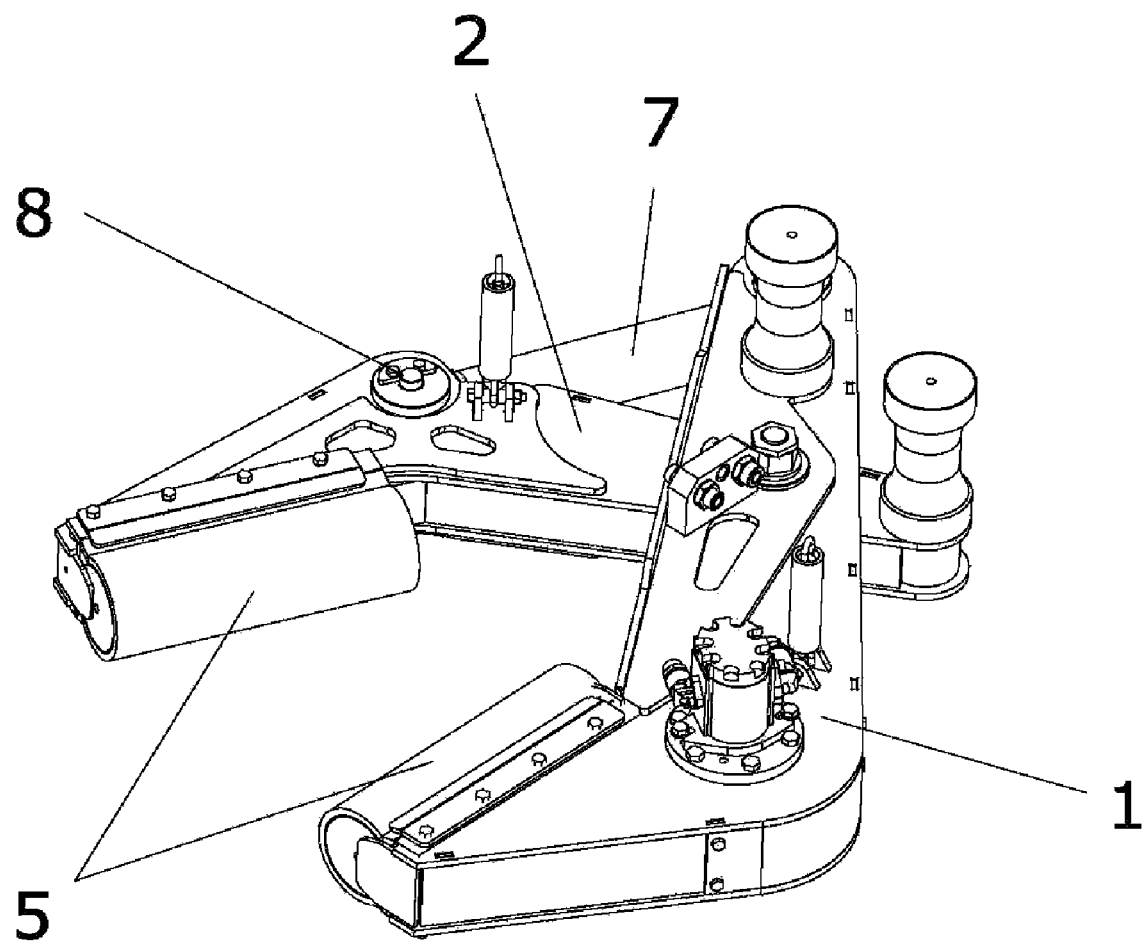
FIG. 1 shows a perspective view of the scissor-type vibrator for shaking trees in an open position.
Figure 2:
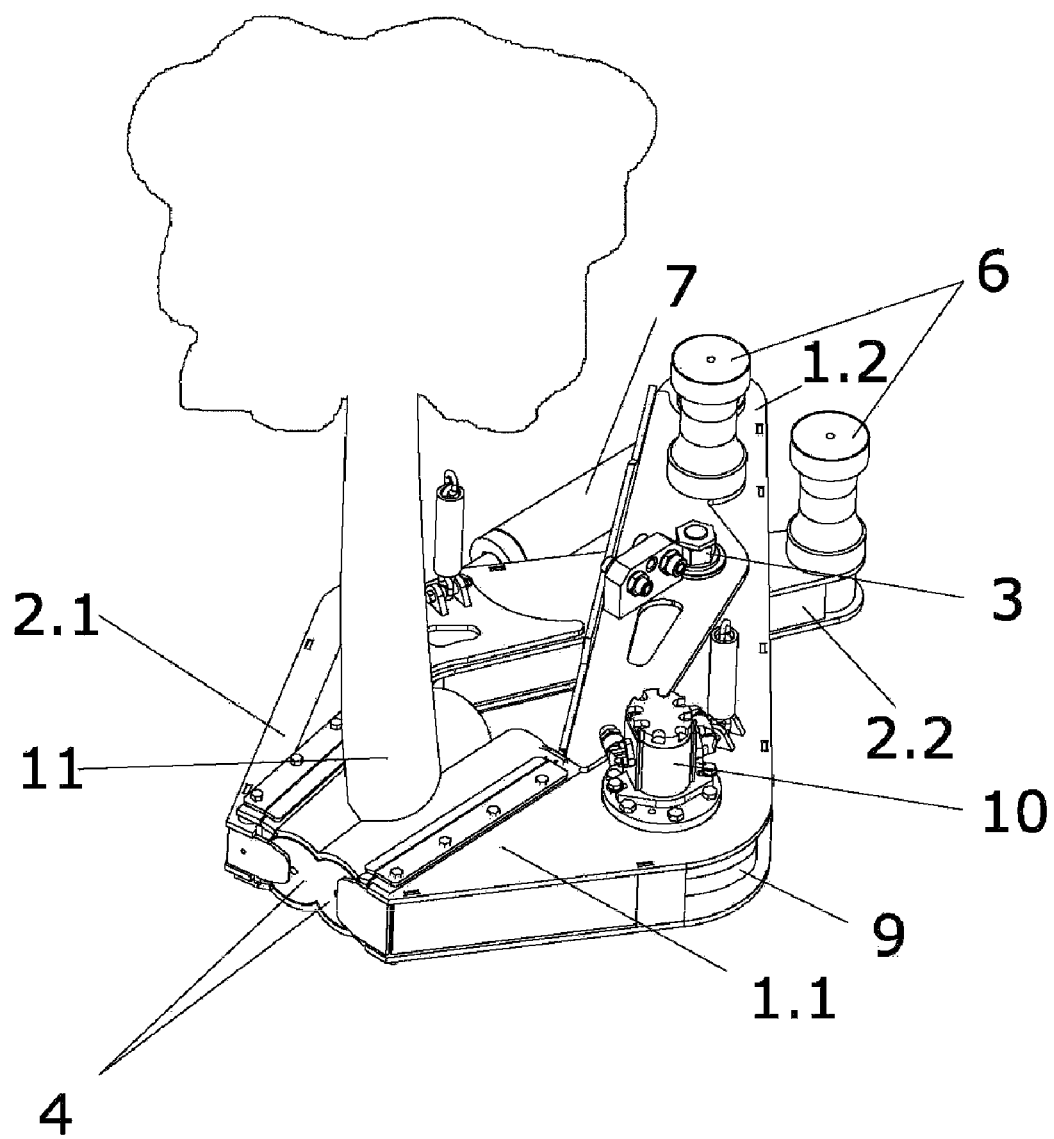
FIG. 2 shows a perspective view of the scissor-type vibrator for shaking trees in a closed position gripping the tree trunk, wherein the cover for access to the cams has also been removed.

In view of the above, the present invention relates to a scissor-type vibrator for shaking trees that makes it possible to grip the tree so that the hydraulic cylinder that actuates one of the scissor arms in relation to the other expands.

The scissor-type vibrator has two arms (1, 2) connected by an articulation (3) that acts as the axis of rotation of one (1) in relation to the other (2) to open and close the mechanism.

The front ends (1.1, 2.1) of the arms (1, 2) have rubber pads (4) protected by rubber flaps (5) that come into contact with the tree (11) to prevent damaging it.

The back ends (1.2, 2.2) of the arms (1, 2) have silent-blocks (6) to balance the weights and prevent the vibrations and noise produced by actuating the vibrator.

One of the two arms (1) extends backwards to the silent-block (6) where one of the ends of the hydraulic cylinder (7) is secured by a bolt (8), whilst the other end is secured by another bolt (8) to the other arm (2) in front of the articulation (3).

Once the arms (1, 2) grip the tree (11), a hydraulic motor (10) actuates a cam (9) consisting of interchangeable off-centred plates, which transmits the movement to the rubber pads (4) to vibrate the tree trunk (11).

Focusing on the essence of the invention, it relates to a scissor-type vibrator for shaking trees of the type that has two arms (1, 2) connected by an articulation (3), characterised in that one of the two arms (1) supports one end of a hydraulic cylinder (7) behind the articulation (3) and the other arm (2) supports the other end of the hydraulic cylinder (7) in front of the articulation (3) so that, on gripping the tree (11), the hydraulic cylinder (7) expands.

Variations in the materials, shape, size and arrangement of the components do not alter the essence of this invention, which is described in a non-limiting manner, said description being sufficient for a person skilled in the art to carry out the procedure.

I claim:

1. Scissor-type vibrator for shaking trees of the type that has two arms (1, 2) connected by an articulation (3), characterized in that one of the two arms (1) supports one end of a hydraulic cylinder (7) behind the articulation (3) and the other arm (2) supports the other end of the hydraulic cylinder (7) in front of the articulation (3) so that, on gripping the tree (11), the hydraulic cylinder (7) expands wherein at the articulation (3) one of the two arms (1) overlies said other arm (2).

2. Scissor-type vibrator for shaking trees according to claim 1, characterized in that the arms (1, 2) have front ends (1.1, 2.1) with rubber pads (4) protected by rubber flaps (5) that come into contact with the tree (11) to prevent damaging it.

3. Scissor type vibrator for shaking trees according to claim 1, characterized in that the arms (1, 2) have back ends (1.2, 2.2) with silent-blocks (6) to balance the weights and prevent the vibrations and noise produced by actuating the vibrator.

4. Scissor-type vibrator for shaking trees according to claim 1, characterized in that one of the two arms (1) extends backwards to the silent-block (6) to support one of the ends of the hydraulic cylinder (7).

5. Scissor-type vibrator for shaking trees according to claim 1, characterized in that the hydraulic cylinder (7) is secured to the arms (1, 2) by bolts.

6. System according to claim 1, characterized in that once the arms (1, 2) grip the tree (11), a hydraulic motor (10) actuates a cam (9) consisting of off-centered plates, which transmits the movement to the rubber pads (4) to vibrate the tree trunk (11).

\* \* \* \* \*